United States Patent [19]

Agrawal et al.

[11] Patent Number: 4,817,392
[45] Date of Patent: Apr. 4, 1989

[54] PROCESS FOR THE PRODUCTION OF ARGON

[75] Inventors: Rakesh Agrawal, Allentown; Steven R. Auvil, Whitehall; Jung S. Choe, Allentown, all of Pa.

[73] Assignee: Air Products and Chemicals, Inc., Allentown, Pa.

[21] Appl. No.: 79,187

[22] Filed: Jul. 29, 1987

Related U.S. Application Data

[63] Continuation-in-part of Ser. No. 874,745, Jun. 16, 1986, Pat. No. 4,717,407, which is a continuation-in-part of Ser. No. 759,027, Jul. 25, 1985, Pat. No. 4,654,063, which is a continuation-in-part of Ser. No. 684,655, Dec. 21, 1984, Pat. No. 4,595,405.

[51] Int. Cl.$^4$ .................................................. F25J 3/00
[52] U.S. Cl. ........................................... 62/18; 55/66; 62/22
[58] Field of Search .......................... 62/18, 22; 55/66

[56] References Cited

U.S. PATENT DOCUMENTS

| 4,144,038 | 3/1979 | Armond | 55/58 |
| 4,421,531 | 12/1983 | Dalton, Jr. et al. | 55/66 |
| 4,477,265 | 10/1984 | Kumar et al. | 55/26 |
| 4,687,498 | 8/1987 | MacLean et al. | 55/66 |
| 4,732,580 | 3/1988 | Jain et al. | 55/66 |

Primary Examiner—Ronald C. Capossela
Attorney, Agent, or Firm—Mark L. Rodgers; William F. Marsh; James C. Simmons

[57] ABSTRACT

The present invention is a process for the production and recovery of an $O_2$-lean argon stream from a gas mixture containing argon and oxygen. The argon-containing gas mixture is initially treated in a cryogenic separation unit to produce a crude argon stream having an argon concentration between 80–98%. The crude argon stream is passed to a membrane separation unit where it is separated to produce an $O_2$-lean argon stream and an $O_2$-rich stream. The $O_2$-rich stream is recycled to the cryogenic separation unit and the $O_2$-lean argon stream is recovered as product or futher purified.

22 Claims, 2 Drawing Sheets

PROCESS FOR THE PRODUCTION OF ARGON

CROSS REFERENCE TO PARENT APPLICATION

This is a continuation-in-part of U.S. patent application Ser. No. 874,745, filed June 16, 1986, now U.S. Pat. No. 4,717,407, which is a continuation-in-part of U.S. patent application Ser. No. 759,027, filed July 25, 1985, now U.S. Pat. No. 4,654,063, which is a continuation-in-part of U.S. patent application Ser. No. 684,655, filed Dec. 21, 1984, now U.S. Pat. No. 4,595,405, the subject matter of all which is hereby incorporated by reference.

TECHNICAL FIELD OF THE INVENTION

The present invention relates to the production and recovery of a purified argon stream. It is particularly related to purifying the argon stream produced in a cryogenic air separation plant.

BACKGROUND OF THE INVENTION

Argon is an inert gas which is used in diverse applications such as welding, electric appliances, inert atmospheres in steel production, etc. Lately, its demand has increased substantially due to the rapid growth of the semiconductor industry. In the semiconductor industry, Ar of an extremely high purity is normally used. As a result, there is a need for processes to produce Ar with substantially low concentrations of $O_2$.

Traditionally, Ar is produced from air in a cryogenic air separation plant, wherein, in addition to the recovery of $O_2$— and $N_2$-rich streams, a crude Ar stream containing about 94–97% Ar, about 3–5% $O_2$, and about 0.01–1% $N_2$ is also recovered. The crude Ar stream is then further purified to produce a high purity Ar stream. In the first step of a typical purification scheme, crude Ar is mixed with $H_2$ and passed through a catalytic hydrogenation unit, such as a Deoxo process, to react $O_2$ with $H_2$ to form water. The water is then removed, and the remaining gas stream is sent to a cryogenic distillation unit to remove the $N_2$. Depending on the concentration of $O_2$ in the crude Ar stream and the required $O_2$ content in the final product, the amount of $H_2$ consumed by this process can be fairly high. The cost of $H_2$ contributes a significant fraction to the overall cost of the purification process. Moreover, in some instances due to the particular location of the air separation plant, an inexpensive $H_2$ source may not be available. As a result, there is a need for purification processes which either do not use $H_2$ or substantially decrease the amount that is required.

Attempts have been made in the past to purify crude Ar without the use of $H_2$. All these processes remove $O_2$ by its preferential kinetic adsorption on carbon molecular sieves. Details of such processes can be found in U.S. Pat. No. 4,477,265 assigned to Air Products and Chemicals, Inc.

U.S. Pat. No. 4,144,038, discloses a process wherein crude Ar from a cryogenic air separation plant is first passed through a bed of molecular sieve carbon for selective adsorption of $O_2$; and the unadsorbed effluent, lean in $O_2$, is passed through a zeolite bed for selective adsorption of $N_2$. In this patent, both adsorbents are packed in the same column, and regeneration of the column is performed by simultaneous vacuum desorption of both adsorbents in the column.

U.S. Pat. No. 4,477,265 teaches a sequence of $N_2$ and $O_2$ removal by adsorption which is the opposite to that taught in the above-mentioned U.S. Pat. No. 4,144,038. In this patent, $N_2$ is first removed from the crude Ar followed by the removal of $O_2$ to provide a pure Ar stream. The $N_2$-selective adsorbent and $O_2$-selective adsorbent are used in different columns. For a given throughput of the feed gas, a lesser number of $O_2$-adsorbing columns than $N_2$-absorbing columns are used.

The processes described in all of the above patents use multibeds, a large number of valves and vacuum pumps, are cyclic in nature, and are complex to operate. There is a need for an alternate non-cyclic and simple process to remove substantial quantities of $O_2$ from a crude Ar stream requiring little or no $H_2$.

BRIEF SUMMARY OF THE INVENTION

The present invention is a process for the production and recovery of an $O_2$-lean argon stream. An argon-containing gas mixture is treated in a cryogenic separation unit to produce a crude argon stream having an argon concentration between 80–98 volume % argon and typically between 2–20% $O_2$ and between 0.01–1% $N_2$. The crude argon stream is subsequently passed to a membrane separation unit containing one or more semipermeable membranes capable of separating oxygen from argon to produce an $O_2$-lean argon stream and an $O_2$-rich stream. The $O_2$-rich stream is recycled to the cryogenic separation unit for further processing, and the $O_2$-lean argon stream is recovered as product.

While for most applications the $O_2$-lean argon stream recovered from the membrane separation unit is of sufficient argon purity; e.g. typically greater than 97%, certain applications may require argon of even higher purities. In these instances, the $O_2$-lean argon stream may be further treated in a catalytic hydrogenation unit, wherein hydrogen is added to further remove oxygen by the catalytic formation of water. Alternatively, or in addition to, the removal of oxygen, the $O_2$-lean argon stream may further be purified by removing nitrogen in a cryogenic distillation unit, or nitrogen adsorption unit. Nitrogen removal may be performed on the $O_2$-lean argon stream from the membrane separation unit, or on the crude argon stream from the cryogenic separation unit.

The present process achieves higher recoveries of substantially purer argon than can be obtained using traditional processing schemes. Additionally, by providing substantially purer argon, the present process often eliminates the need for an additional purification process to remove $O_2$. If an additional process, such as catalytic hydrogenation, is used, the present process greatly reduces the hydrogen consumption in such a process.

DETAILED DESCRIPTION OF THE INVENTION

The present invention is a process for producing and recovering an $O_2$-lean argon stream from an argon-containing gas mixture. The $O_2$-lean argon stream produced by this process preferably has an oxygen concentration equal to or less than about 3%, an argon concentration of at least 96%, and preferably at least 98%.

Figure 1:
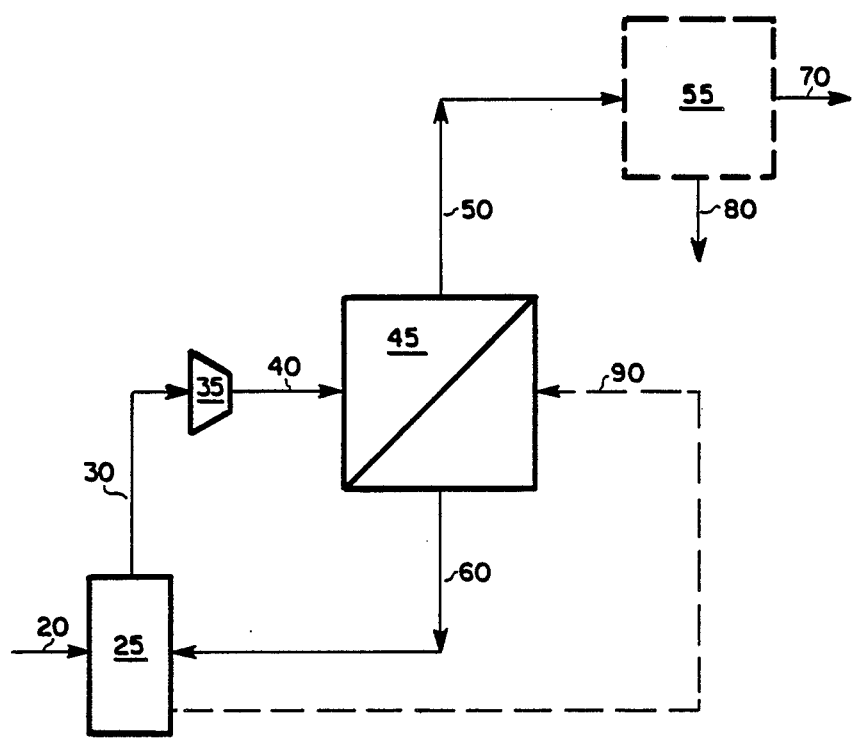
FIG. 1 is a schematic flow diagram of one embodiment of the present invention.

Referring to the drawing of FIG. 1, an argon-containing gas mixture 20 is treated in a cryogenic separation unit 25 to produce a crude argon stream 30 typically having an argon concentration between 80-98%. In a preferred embodiment, the cryogenic separation unit 25 is a conventional cryogenic air separation unit (ASU) having an argon distillation column wherein air is cryogenically treated to produce a crude argon stream containing between 3-5% $O_2$ and between 0.01-1% $N_2$, although other cryogenic separation units can be used which produce a crude argon stream having larger concentrations of oxygen (e.g. up to about 10%) and/or nitrogen. The crude argon stream 30 from the cryogenic separation unit 25, is typically close to atmospheric pressure and is subsequently compressed to between about 50 and 150 psia in compressor 35 to produce a compressed crude argon stream 40. The compressed crude argon stream 40 is subsequently passed to a membrane separation unit 45 which contains one or more semi-permeable membranes which are capable of separating oxygen from argon. The crude argon stream 40 is separated in the membrane separation unit 45 to produce an $O_2$-lean argon stream 50 and an $O_2$-rich stream 60. The $O_2$-rich stream 60, typically containing between about 3-50% $O_2$ is recycled back to the cryogenic separation unit 25 for further processing. The $O_2$-lean argon stream 50 preferably contains less than or equal to about 3% $O_2$ and preferably at least about 97% argon and is subsequently recovered as $O_2$-lean product. In some instances, an even purer argon stream than can be produced in the membrane separation unit 45 may be required for subsequent operations. In these instances, the $O_2$-lean argon stream 50 may be passed to a downstream purification unit 55, such as a catalytic hydrogenation unit, a cryogenic nitrogen removal unit or a nitrogen adsorption unit, to produce an even purer $O_2$-lean argon product stream 70 with the generation of an impurity containing waste stream 80.

Typically, the removal of $N_2$ from an argon stream by cryogenic distillation is much easier than the removal of $O_2$ from argon by cryogenic distillation. As a result, in some embodiments, it may be beneficial to use an essentially $O_2$-free $N_2$ stream 90 such as from the cryogenic air separation unit 25, as a sweep stream on the permeate side of the membrane separation unit 45. This nitrogen sweep stream 90 reduces the partial pressure of $O_2$ on the permeate side of the membrane and thereby increases the flux of $O_2$ through the membrane. Consequently the argon recovery from the membrane unit will also increase. Employing this nitrogen sweep 90, however, increases the nitrogen concentration in the $O_2$-lean argon stream 50 from the membrane. Because the $N_2$ can be easily removed in a subsequent cryogenic $N_2$ distillation unit, e.g. such as separator 55, employing this added separation step may be beneficial to the overall process scheme. This is especially true since the $O_2$-rich permeate stream 60 containing $N_2$ from the sweep stream 90, is recycled back to the cryogenic air separation unit 25. This allows recovery of both the nitrogen used in the sweep stream 90 and the oxygen and argon contained in the permeate stream 60.

Figure 2:
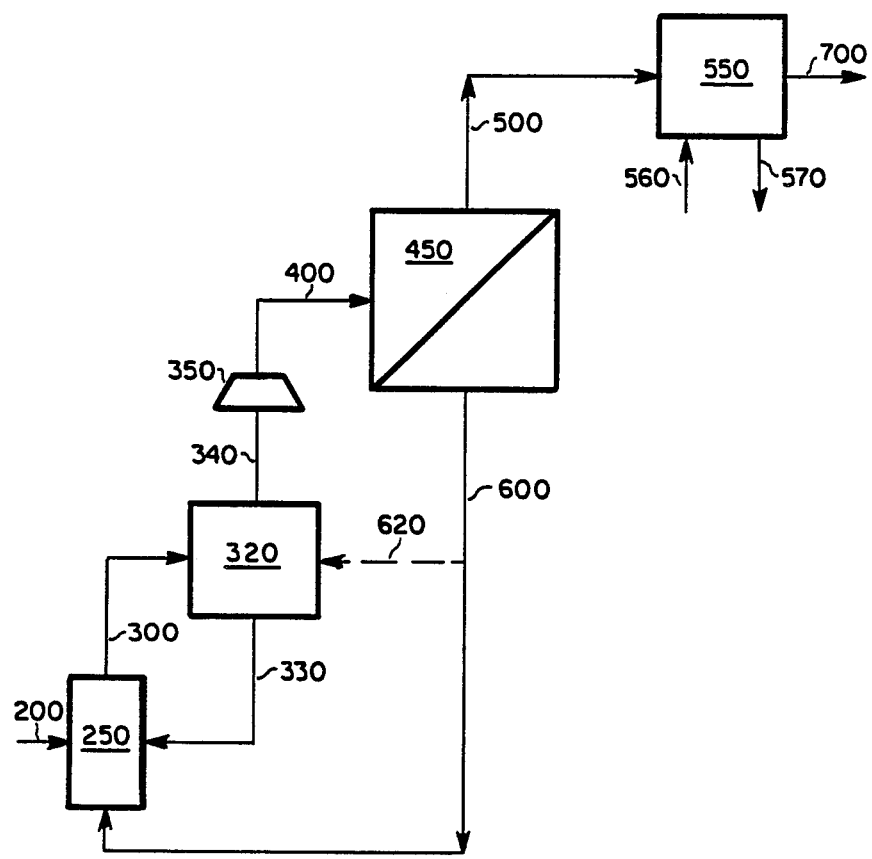
FIG. 2 is a schematic flow diagram of a second embodiment of the present invention.

A second embodiment of the present invention is set out in FIG. 2. The crude argon stream 300 from the cryogenic separation unit 250 is passed directly to an adsorption unit 320, containing an adsorbent bed capable of preferentially adsorbing $N_2$ from its admixture with Ar and $O_2$. Typical examples of these adsorbents are suitable cation exchanged zeolites such as calcium X, lithium mordenite, etc. The nitrogen adsorption unit 320 produces a nitrogen-free stream 340 which is optionally compressed in compressor 350 to form a nitrogen-free stream 400 which is subsequently passed to a membrane separation unit 450. The nitrogen-free stream 400 contains predominately argon, with a small amount, i.e. between 2-20% oxygen, and is separated in the membrane separation unit 450 to form an oxygen-lean argon stream 500 and an oxygen-rich reject stream 600. The $O_2$-lean argon stream 500, typically contains less than about 3% oxygen and can be recovered directly as product, or alternatively can be treated in a catalytic hydrogenation unit 550 to further remove oxygen. A small amount of hydrogen 560 must be added to the catalytic hydrogenation unit 550 in order to remove the excess oxygen in the $O_2$-lean argon stream 500, to produce a further purified argon product stream 700. A by-product from the catalytic hydrogenation is a water stream 570 which may be recovered for subsequent use or else simply discarded. The desorbed nitrogen from the nitrogen adsorption unit 320 is recycled to the cryogenic separation unit 250 as stream 330. Additionally, the $O_2$-rich permeate stream 600 from the membrane separation unit 450 is also recycled to the cryogenic separation unit 250 for further processing. An additional degree of freedom in operating the process parameters of the present invention can be achieved in that instead of a nitrogen-free argon stream from the adsorption unit, some of the $O_2$-rich, but nitrogen free permeate stream from the membrane unit may be used as stream 620 to purge the adsorption bed in the adsorption separation unit 320 during the regeneration step of the unit. This will allow an increase in the recovery of argon from the adsorption unit itself.

The membrane separation units employed in the present process can include any type of units which contain semi-permeable membranes which have different permeation rates for oxygen and argon. The membrane units themselves can include one or more discreet membrane modules which are plumbed and operated in a way to achieve the desired degree of argon recovery and $O_2$ level in the argon, at the greatest efficiency. Typical configurations of membrane modules include several membranes in series, in parallel, or staged such as in a cascade arrangement. While both FIGS. 1 and 2 show compressors on the feed side of the membrane; 35 and 350 in FIGS. 1 and 2 respectively, alternatively a vacuum pump could be used on the permeate side of the membrane in combination with or to replace the compressors.

The present membrane/cryogenic hybrid schemes provide higher recoveries of substantially purer Ar than can be obtained by stand-alone cryogenic separation units. For example, if an argon stream containing 98% argon is produced, the hybrid process can easily recover between 40-50% more argon than the stand-alone cryogenic process. Furthermore, by providing substantially purer Ar, it often eliminates the need for another purification process to remove $O_2$, such as a Deoxo unit, or at least significantly reduces the hydrogen consumption needed for such a such a subsequent operation.

The present invention makes effective use of semipermeable membranes. When a pressure differential is maintained across the membranes, $O_2$ typically permeates faster than Ar. As a result, the permeate stream is richer in $O_2$ than the feed stream; and the reject stream from the membrane is leaner in $O_2$. Membranes based on active transport or containing chemical complexes which facilitate transport of $O_2$ through membranes are particularly attractive because of their high $O_2$ to Ar selectivities. These membranes provide higher Ar recovery and improve the efficiency of the process.

It is difficult to cryogenically produce Ar with low concentrations of $O_2$ (less than 3%). In a typical cryogenic distillation, as the concentration of $O_2$ in the Ar stream is reduced, the recovery of Ar from the unit also drops. The present method allows the cryogenic processes to produce an impure Ar stream with concentration of $O_2$ that are substantially higher than that required by a stand-alone unit. This stream is then treated in a suitable membrane unit to produce a permeate stream which is richer in $O_2$ than the impure Ar and is returned to the cryogenic ASU, where it is further processed to produce more impure Ar. The higher concentrations of $O_2$ in the returning permeate stream and impure Ar significantly reduce the demands on the ASU. Due to this synergistic effect, the overall recovery of Ar from the combined process can be higher than that of the stand-alone cryogenic ASU. This higher recovery of Ar is achieved while producing Ar which is more lean in $O_2$ than that produced by the stand-alone cryogenic ASU.

Furthermore, the present invention discloses a method to take advantage of the fact that the cryogenic separation of $N_2$ from Ar is easier than separating $O_2$ from Ar. Thus, in some embodiments, employing a $N_2$ sweep on the permeate side of a membrane not only increases the Ar recovery from the membrane unit but also decreases the membrane area required. The $N_2$ permeate stream is recycled to the main cryogenic ASU where $N_2$ and Ar are readily reseparated.

In summary, the judicious use of membrane and cryogenic processes provides an effective and efficient way of removing substantial quantities of $O_2$ from an impure Ar stream, thereby significantly reducing or eliminating the $H_2$ requirements. This reduction in the $H_2$ requirement is accompanied by Ar recoveries that are higher than can be achieved via traditionally employed processing schemes.

The following examples are included to illustrated the process of the present invention, and are not meant to be limiting.

EXAMPLE 1

A computer simulated run was carried out for the process scheme of FIG. 1 wherein a crude Ar stream containing 4.99% $O_2$ and 0.01% $N_2$ from the crude Ar column of a cryogenic ASU is processed in a semipermeable membrane unit to produce a welding grade Ar stream containing 2% $O_2$. Calculations were done for two membrane units, one with an $O_2$ to Ar permeability ratio of 2.5 and the other one with a ratio of 5. The results are summarized in Table 1 below.

TABLE 1

Production of Welding Grade Argon According to the Scheme Presented in FIG. 1
Feed to Membrane (Stream 40)
Flow Rate = 100 lb moles/hr
Ar = 95.0%
$O_2$ = 4.99%
$N_2$ = 0.01%
Pressure = 150 psia

| | Case | |
|---|---|---|
| | I | II |
| $O_2$/Ar Permeability Ratio | 2.5 | 5.0 |
| Permeate Pressure (psia) (Stream 60) | 15 | 15 |
| Product Argon (Stream 50) Flow Rate (lb moles/hr) | 43.7 | 67.4 |
| Ar (%) | 97.98 | 97.99 |
| $O_2$ (%) | 2.0 | 2.0 |
| $N_2$ (%) | 0.02 | 0.01 |

From Table 1, it can be seen that even a low $O_2$/Ar permeability ratio in the membrane unit of 2.5 is capable of providing the desired product with good Ar recovery. Furthermore, since the permeate stream, 60, is recycled to the main ASU, the total Ar recovery from the overall process is very high.

EXAMPLE 2

A computer simulated run was carried out to produce an $O_2$-lean Ar stream according to the process scheme presented in FIG. 1 wherein a crude Ar stream containing 2.99% $O_2$ and 0.01% $N_2$ 30 is produced in the ASU 25. As in example 1, calculations were done for two membrane units, one with an $O_2$ to Ar permeability ratio of 2.5 and the other one with a ratio of 5. Both the membrane units were used to produce an $O_2$-lean Ar stream 50 containing 1% $O_2$. The $O_2$-lean Ar stream 50 is then sent to a catalytic hydrogenation unit 55. since the concentration of $O_2$ in the $O_2$-lean argon stream 50 is now less, the consumption of $H_2$ in the hydrogenation unit 55 is reduced. The $O_2$-free Ar stream 70 from the catalytic hydrogenation unit 55 may be recovered or further treated in a cryogenic $N_2$ distillation unit for $N_2$ removal. The results are reported in Table 2 below.

TABLE 2

Production of $O_2$-Free Argon According to the Scheme Presented in FIG. 1
Feed to Membrane (Stream 40)
Flow Rate = 100 lb moles/hr
Ar = 97.0%
$O_2$ = 2.99%
$N_2$ = 0.01%
pressure = 150 psia

| | Case | |
|---|---|---|
| | I | II |
| $O_2$/Ar Permeability Ratio | 2.5 | 5.0 |
| Permeate pressure (psia) (Stream 60) | 15 | 15 |
| $O_2$-Lean Argon (Stream 50) Flow Rate (lb moles/hr) | 38.1 | 63.4 |
| Ar (%) | 98.98 | 98.99 |
| $O_2$ (%) | 1.0 | 1.0 |
| $N_2$ (%) | 0.02 | 0.01 |

EXAMPLE 3

Calculations were redone for the case presented in example 2, wherein a membrane is employed with a pure $N_2$ sweep 90 on the permeate side. For 100 lb moles/hr of feed to the membrane, 100 lb moles/hr of $N_2$ sweep were used. The permeate from the membrane 60 is recycled to the main cryogenic ASU 25 to recover the contained AR and $N_2$. Calculations for this example were done using the permeabilities used in example 2. Furthermore, the composition of the $O_2$-lean Ar stream, 50, was chosen such that the ratio of the $O_2$ to Ar content is the same as in example 2 (about 1 mole of $O_2$ for every 99 moles of Ar). The results are reported in Table 3 below.

TABLE 3

Production of $O_2$-Lean Argon According to the Scheme Presented in FIG. 1 Using a Nitrogen Sweep
Nitrogen Sweep Flow Rate: 100 lb moles/hr
Feed to Membrane (Stream 40)
Flow Rate = 100 lb moles/hr
Ar = 97.0%
$O_2$ = 2.99%
$N_2$ = 0.01%
Pressure = 150 psia
$O_2/N_2$ Permeability Ratio = 5.8

| | Case I | Case II |
|---|---|---|
| $O_2$/Ar Permeability Ratio | 2.5 | 5.0 |
| Permeate Pressure (psia) (Stream 60) | 15 | 15 |
| $O_2$-Lean Argon Stream (50) Flow Rate (lb moles/hr) | 43.15 | 71.79 |
| Ar (%) | 96.58 | 96.96 |
| $O_2$ (%) | 0.96 | 0.97 |
| $N_2$ (%) | 2.46 | 2.07 |
| Membrane Area Relative to Example 2 | 0.89 | 0.75 |

A comparison of Tables 2 and 3 shows that the concentration of $N_2$ in the $O_2$-lean stream is higher in Example 3 and, therefore, a $N_2$ removal unit located downstream may be needed to remove excess $N_2$. However, as compared to example 2, the Ar recovery from the membrane unit has now increased by about 11% which was achieved with 10-25% less membrane area. Thus, the use of a $N_2$ sweep on the permeate side, when feasible (e.g. a product application which can tolerate higher $N_2$ concentrations), is beneficial. Additionally, even employing a $N_2$ removal unit downstream, in many instances can be more efficient in view of the increased argon recovery.

EXAMPLE 4

Calculations were done to produce 98% Ar product from a combined cryogenic ASU and membrane cycle shown in FIG. 1. The permeate stream, 60, from the membrane unit was cooled and fed as a secondary feed to an intermediate stage of a cryogenic crude Ar column section of the ASU. The flow rate, composition, and pressure of the primary feed stream to the crude argon column was fixed at 100 lb moles/hr, 8.6 mole % Ar, 91.4 mole % $O_2$, and 20 psia. This stream, which also contains trace quantities of $N_2$, is obtained as a saturated vapor from the low pressure distillation column of a typical double distillation column cycle of the ASU. The reflux at the top of the cryogenic crude argon column is provided by condensing a part of the vapor in a condenser. The heat, Q, in the condenser is typically removed by boiling a part of the $O_2$-rich liquid from the bottom of the high pressure distillation column.

Calculations were done for various compositions of the crude Ar stream, 30, from the cryogenic crude Ar column. As stated earlier, the flow rate, composition, and pressure of the primary feed stream to the cryogenic crude Ar column for all these calculations were fixed. Therefore, the composition of stream 30, which also forms the feed to the membrane unit, was varied by changing the heat removal, Q, in the condenser at the top of the cryogenic crude Ar column. The process conditions for various streams shown in FIG. 1 for this example are given in Table 4 when the feed to the membrane is 94.6% Ar. The $O_2$ to Ar permeability ratio for the membrane used in this table is 5. The process conditions and calculations for the same process scheme having a membrane with an $O_2$ to Ar permeability ratio of 2.5, and a membrane feed containing 96.5% Ar, are set out in Table 5.

TABLE 4

Argon Production Via Cryogenic/Membrane Process Scheme of FIG. 1
$O_2$/Ar Permeability Ratio = 5.0
Total Heat, Q, Removed in Condenser = 27.95 × $10^4$ BTU/hr
Energy Input in Compressor = 4.03 KW

| Stream Number | 30 | 40 | 50 | 60 |
|---|---|---|---|---|
| Pressure (psia) | 18.1 | 150.0 | 148.0 | 18.5 |
| Temperature (°F.) | −298.8 | 85.0 | 85.0 | 85.0 |
| Total Flow (lb moles/hr) | 4.5 | 4.5 | 2.85 | 1.65 |
| Composition (mole %) | | | | |
| Ar | 94.57 | 97.57 | 98.0 | 88.62 |
| $O_2$ | 5.43 | 5.43 | 2.0 | 11.38 |
| $N_2$ (ppm) | 14.1 | 14.1 | 15.4 | 12.1 |

TABLE 5

Argon Production Via Cryogenic/Membrane Process Scheme of FIG. 1
$O_2$/Ar Permeability Ratio = 2.5
Total Heat, Q, Removed in Condenser = 28.00 × $10^4$ BTU/hr
Energy Input in Compressor = 4.03 KW

| Stream Number | 30 | 40 | 50 | 60 |
|---|---|---|---|---|
| Pressure (psia) | 18.1 | 150.0 | 148.0 | 18.5 |
| Temperature (°F.) | −298.9 | 85.0 | 85.0 | 85.0 |
| Total Flow (lb moles/hr) | 4.5 | 4.5 | 2.68 | 1.82 |
| Composition (mole %) | | | | |
| Ar | 96.5 | 96.5 | 98.0 | 94.29 |
| $O_2$ | 3.5 | 3.5 | 2.0 | 5.71 |
| $N_2$ (ppm) | 12.3 | 12.3 | 16.4 | 6.6 |

EXAMPLE 5 (COMPARATIVE)

Calculations were done for the stand-alone cryogenic unit, i.e., for the process shown in FIG. 1 when no membrane is used and stream 30 is the final product. The flow rate of stream 30 and the heat, Q, removed in the condenser associated with the cryogenic unit to produce 97 and 98% Ar streams are reported in Table 6 below.

TABLE 6

Argon Production Via Stand-Alone Cryogenic Unit

| | Case I | Case II |
|---|---|---|
| % Ar in Crude Ar Stream 30 | 97 | 98 |
| Flow Rate of Stream 30 (lb moles/hr) | 2.62 | 1.89 |
| Heat, Q, Removed in Condenser (BTU/hr) | 28.02 × $10^4$ | 28.21 × $10^4$ |
| Energy Required to Compress the product to 150 psia (KW) | 2.35 | 1.7 |

From the results reported in Table 6, compared with the results in Tables 1–5, it can be seen that the cryogenic/membrane process can produce much purer Ar with greater recoveries than the stand-alone cryogenic process. For example, if an Ar stream containing 98% Ar is produced, the hybrid process can easily recover 40–50% more Ar than the stand-alone cryogenic process. Even membranes with an $O_2$/Ar permeability ratio of 2.5 are significantly more effective for this application.

Generally, a stand-alone cryogenic process produces about 97% Ar, which is then purified using a Deoxo process. The hybrid process can produce 98% Ar with recoveries greater than can be achieved using the stand-alone cryogenic process to produce 97% Ar. For example, the Ar recoveries using membranes with an $O_2/Ar$ permeability ratio of 2.5 are greater by more than 3% while recoveries with membranes having a permeability ratio of 5 are greater by more than 10%. Therefore, if Ar of high purity (greater than 99% Ar) is needed, the use of the hybrid process not only significantly reduces the consumption of $H_2$ but also increases the recovery of Ar.

In a stand-alone cryogenic process, as the purity of Ar is increased, the reflux requirement in the crude Ar column also increases. As a result, the heat to be removed in the top condenser increases. For the hybrid process producing 98% Ar, the heat, Q, is less than that of the stand-alone cryogenic process producing either 98 or 97% Ar. This synergistic effect is due to the fact that the cryogenic crude Ar column does not have to work as hard; i.e., it only has to produce a low purity Ar stream (94.57% in Table 4 and 96.5% in Table 5).

EXAMPLE 6

A comparison was made between the incremental power consumed per lb mole of Ar product for a stand-alone cryogenic unit producing 98% Ar with that for the present process employing a membrane with an $O_2/Ar$ permeability ratio of 2.5 (Table 5). The stand-alone cryogenic unit requires about 2122 BTU/hr more heat, Q, to be removed in the condenser. Assuming an efficiency of 0.35 to create this refrigeration, the actual energy required for this additional heat removal is 1.79 KW. This additional energy plus the energy to drive the compressor, 1.7 KW (see Table 6), gives a total energy requirement of 3.49 KW or 1.84 KWH/lb mole of Ar. This power can be compared with the specific compressor power of 1.50 KWH/lb mole of Ar product calculated from Table 5 for the hybrid process. Similar calculations for a hybrid process with an $O_2/Ar$ permeability ratio of 5 gives a power of 2.05 KWH/lb mole of Ar for the stand-alone cryogenic relative to 1.41 KWH/lb mole of Ar for the hybrid process. Even though these power numbers are small relative to the total power consumed by the main cryogenic air separation plant, it nevertheless indicates that the power consumed by the hybrid process can be less than the stand-alone cryogenic process.

In summary, this example shows that the scheme suggested in FIG. 1 can produce high purity Ar at much higher recoveries than the stand-alone cryogenic process, and it does so with fairly low incremental energy consumption. For the same Ar purity, the power consumed by the hybrid can be lower than the stand-alone cryogenic process.

Having thus described the present invention, what is now deemed appropriate for Letters Patent is set out in the following appended claims.

What is claimed is:

1. A process for producing an $O_2$-lean argon stream comprising:
   (a) treating an argon-containing gas mixture in a cryogenic separation unit to produce a crude argon stream having an argon concentration between 80–98 volume % argon;
   (b) passing said crude argon stream to a membrane separation unit which is capable of separating oxygen from argon to produce an $O_2$-lean argon stream and an $O_2$-rich stream;
   (c) recycling the $O_2$-rich stream to the cryogenic separation unit; and
   (d) recovering the $O_2$-lean argon stream.

2. A process in accordance with claim 1 wherein said cryogenic separation unit is a cryogenic air separation unit with an argon distillation column.

3. A process in accordance with claim 1 wherein said $O_2$-lean argon stream has an oxygen concentration of less than 3% by volume.

4. A process in accordance with claim 1 wherein said $O_2$-lean argon stream recovered from the membrane separation unit is subsequently treated in a nitrogen removal unit to remove nitrogen present in said stream.

5. A process in accordance with claim 4 wherein the nitrogen removal unit is a cryogenic unit.

6. A process in accordance with claim 4 wherein the nitrogen removal unit is an adsoprtion unit.

7. A process in accordance with claim 6, wherein a portion of the $O_2$-rich stream from the membrane separation unit is used to regenerate the adsorption unit.

8. A process in accordance with claim 7 wherein said $O_2$-rich stream from the membrane separation unit is a permeate stream.

9. A process in accordance with claim 1 wherein the crude argon stream from the cryogenic separation unit is treated in a nitrogen removal unit prior to being passed to the membrane separation unit.

10. A process in accordance with claim 9 wherein the nitrogen removal unit is an adsorption unit.

11. A process in accordance with claim 10, wherein a portion of the $O_2$-rich stream from the membrane separation unit is used to regenerate the adsorption unit.

12. A process in accordance with claim 1 wherein said $O_2$-lean argon stream has an argon concentration of at least 97 volume %.

13. A process in accordance with claim 1 wherein the $O_2$-lean argon stream recovered from the membrane separation unit is subsequently passed to a catalytic hydrogenation unit to further remove oxygen.

14. A process for producing an $O_2$-lean argon stream comprising:
   (a) treating an argon-containing gas mixture in a cryogenic separation unit to produce a crude argon stream having an argon concentration between 80–98 volume % argon, and an essentially $O_2$-free nitrogen stream;
   (b) treating said crude argon stream in a membrane separation unit which is capable of separating oxygen and argon to produce an $O_2$-lean argon reject stream and an $O_2$-rich permeate stream;
   (c) employing the essentially $O_2$-free nitrogen stream from the cryogenic separation unit as a sweep stream on the permeate side of the membrane to reduce the partial pressure of $O_2$ on the permeate side of the membrane thereby increasing the flux of $O_2$ through the membrane;
   (d) recycling the $O_2$-rich permeate stream along with the nitrogen sweep stream to the cryogenic separation unit; and
   (e) recovering the $O_2$-lean, argon reject stream from the membrane separation unit.

15. A process in accordance with claim 14 wherein said cryogenic separation unit is a cryogenic air separation unit with an argon distillation column.

16. A process in accordance with claim 14 wherein said $O_2$-lean argon reject stream has an oxygen concentration of less than 3% by volume.

17. A process in accordance with claim 14 wherein said $O_2$-lean argon reject stream recovered from the membrane separation unit is subsequently treated in a nitrogen removal unit to remove nitrogen present in said stream.

18. A process in accordance with claim 17 wherein the nitrogen removal unit is a cryogenic unit.

19. A process in accordance with claim 17 wherein the nitrogen removal unit is an adsorption unit.

20. A process in accordance with claim 19, wherein a portion of the $O_2$-rich permeate stream from the membrane separation unit is used to regenerate the adsorption unit.

21. A process in accordance with claim 14 wherein said $O_2$-lean argon reject stream has an argon concentration of at least 97 volume %.

22. A process in accordance with claim 14 wherein the $O_2$-lean argon reject stream recovered from the membrane separation unit is subsequently passed to a catalytic hydrogenation unit to further remove oxygen.

* * * * *